United States Patent
Galamb

(10) Patent No.: US 9,428,059 B2
(45) Date of Patent: Aug. 30, 2016

(54) VEHICLE HAVING IMPROVED BATTERY SHIELDING

(71) Applicant: Robert Bosch GmbH, Stuttgart (DE)

(72) Inventor: Gergely Galamb, Traunstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/755,027

(22) Filed: Jun. 30, 2015

(65) Prior Publication Data

US 2015/0375623 A1 Dec. 31, 2015

(30) Foreign Application Priority Data

Jun. 30, 2014 (DE) .................. 10 2014 212 540

(51) Int. Cl.
*B60K 1/04* (2006.01)
*B60L 3/00* (2006.01)
*B60L 15/00* (2006.01)

(52) U.S. Cl.
CPC ............... *B60L 3/0046* (2013.01); *B60K 1/04* (2013.01); *B60L 15/007* (2013.01); *B60K 2001/0438* (2013.01)

(58) Field of Classification Search
CPC ............ B60K 1/04; B60K 2001/0438; B60K 2001/0455; B60K 2001/0472; B60L 3/0046; B60L 3/0069; B60L 15/007
USPC ................................. 180/68.5, 2.1
See application file for complete search history.

(56) References Cited

U.S. PATENT DOCUMENTS

| 8,146,694 | B2 * | 4/2012 | Hamidi ............... B60K 1/04 180/68.5 |
| 8,893,838 | B2 * | 11/2014 | Ichikawa ........... B60L 11/1822 180/65.1 |
| 8,893,843 | B2 * | 11/2014 | Hayano ............. B60L 15/007 180/232 |
| 9,126,491 | B2 * | 9/2015 | Ichikawa ............ B60L 11/182 |
| 2003/0066694 | A1 | 4/2003 | Mita et al. |
| 2009/0242299 | A1 | 10/2009 | Takasaki et al. |
| 2011/0036657 | A1 | 2/2011 | Bland et al. |
| 2014/0346815 | A1 * | 11/2014 | Keutz ................... B62D 25/20 296/193.07 |

FOREIGN PATENT DOCUMENTS

| CN | 203237020 | 10/2013 |
| CN | 203372290 U | 1/2014 |
| DE | 102008024291 A1 | 11/2009 |
| DE | 102009006990 A1 | 8/2010 |
| DE | 102011056807 A1 | 6/2013 |
| WO | 2012123596 A1 | 9/2012 |

* cited by examiner

*Primary Examiner* — John Walters
(74) *Attorney, Agent, or Firm* — Michael Best & Friedrich LLP

(57) ABSTRACT

A vehicle comprising a vehicle body (2) and a battery (3) with energy storage devices (31) and a housing (32), which at least partially surrounds the energy storage devices (31), wherein a vehicle-body region (21) of the vehicle body (2) forms a part of the housing of the battery (3), wherein the vehicle-body region (21) is made from an electrically conductive material or comprises electrically conductive material in order to shield the vehicle against electrical and/or magnetic fields.

11 Claims, 2 Drawing Sheets

VEHICLE HAVING IMPROVED BATTERY SHIELDING

BACKGROUND OF THE INVENTION

The present invention relates to a vehicle having a battery with improved shielding against electrical and/or magnetic fields.

Vehicles having batteries are recently increasingly being offered on the market, for example in the form of electric vehicles and/or hybrid vehicles. A problem area of such vehicles here is electromagnetic compatibility of such batteries. Owing to high electric currents in the main circuit and, for example, the use of inverters, there is a high electromagnetic disturbance potential of such batteries. This being the case, such batteries must be shielded. For this purpose, the battery and/or the inverter are/is usually installed in a metal housing in order to avoid electrical and/or magnetic disturbances from other electrical and/or electronic components of the vehicle. However, as a result of this, additional costs are incurred in the case of the shielded housings and such battery arrangements are heavier. An electric vehicle with an exchangeable battery is also known from CN 203237020 U, wherein the battery is arranged in a base region of the vehicle. In this case, a housing of the battery is mechanically connected to a vehicle body of the vehicle. Removable cover plates are provided here for rapid exchange of the battery.

SUMMARY OF THE INVENTION

In contrast, the vehicle according to the invention has the advantage that a battery can be electrically and/or magnetically shielded in an inexpensive manner. In particular, the idea according to the invention can be realized in a very compact manner, with the result that the battery can be arranged on a vehicle-body region of a vehicle body of the vehicle in a neat manner, wherein optimum electromagnetic shielding is possible. This is achieved according to the invention in that a vehicle-body region of the vehicle body forms a part of the housing of the battery. The vehicle-body region which forms the part of the housing of the battery is in this case made from an electrically conductive material. As a result, electromagnetic shielding of the battery with respect to the rest of the vehicle is achieved by means of the vehicle-body region. As a result of this, a part of the housing of the battery can be saved, which leads to advantages in terms of installation space and to a reduction in weight.

Preferably, the shielding vehicle-body region of the vehicle body forms a cover of the housing.

Further preferably, the shielding vehicle-body region forms a base of the housing.

According to another preferred configuration of the invention, the shielding vehicle-body region forms one or more walls of the housing.

According to another preferred configuration of the invention, the shielding vehicle-body region is part of an underbody of the vehicle. As a result of this, the battery can be arranged in the underbody region of the vehicle, with the result that, in particular, a low center of gravity of the vehicle becomes possible.

Further preferably, the vehicle body has a recess in which the battery is at least partially, in particular completely, arranged. As a result of this, a compact and space-saving arrangement of the battery can be enabled.

Particularly preferably, the housing of the battery comprises an electrically conductive material for shielding against electrical and/or magnetic fields.

As a result of this, the battery can be completely shielded. It should be noted that the housing must not compulsorily comprise an electrically conductive material if, for example, the electrically conductive vehicle-body region forms a cover of the battery housing and the battery is arranged in the underbody of the vehicle, with the result that the vehicle is shielded with respect to the battery. In this case, the battery can be, for example, fastened to the vehicle body from an underside of the vehicle.

In order to achieve particularly good electrical and/or magnetic shielding, the vehicle preferably has a circumferentially closed, electrically conductive connection between the shielding vehicle-body region and the rest of the housing of the battery. The connection is particularly preferably embodied as a low-impedance connection in order to afford an electric resistance which is as low as possible. Said low-impedance connection affords a significant safety advantage, even if, for example, an insulation fault were to be present at the battery and a person touched the battery at different points since said person would not receive an electric shock since the current is diverted through the housing and does not flow through the body of the person.

In this case, what is particularly preferable is for the connection between the shielding vehicle-body region and the housing to be realized by means of metal resilient contacts or alternatively by a cohesive, electrically conductive connection between the shielding vehicle-body region and the housing.

Further preferably, an inverter, which is connected to the battery of the vehicle, is provided, wherein the inverter is likewise at least partially shielded by a vehicle-body region. As a result of this, additional shielding of the inverter can likewise be dispensed with.

BRIEF DESCRIPTION OF THE DRAWINGS

Preferred exemplary embodiments of the invention are described in detail below with reference to the appended drawing, in which.

DETAILED DESCRIPTION

A vehicle 1 according to a first preferred exemplary embodiment of the invention is described in detail below with reference to FIGS. 1 and 2.

Figure 1:
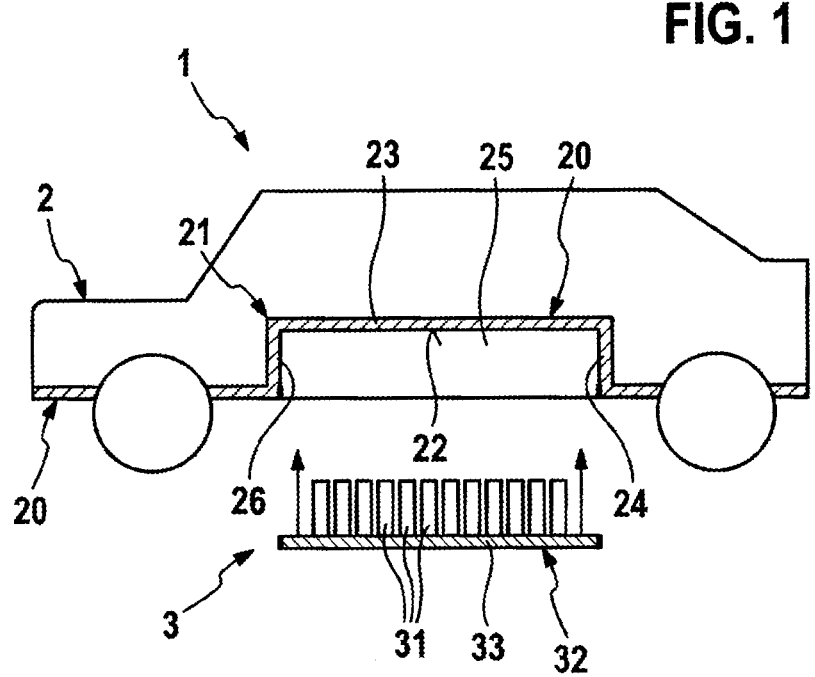
FIG. 1 is a schematic view of a vehicle according to a first exemplary embodiment of the invention, which illustrates a process of mounting the battery on a vehicle body.
Figure 2:
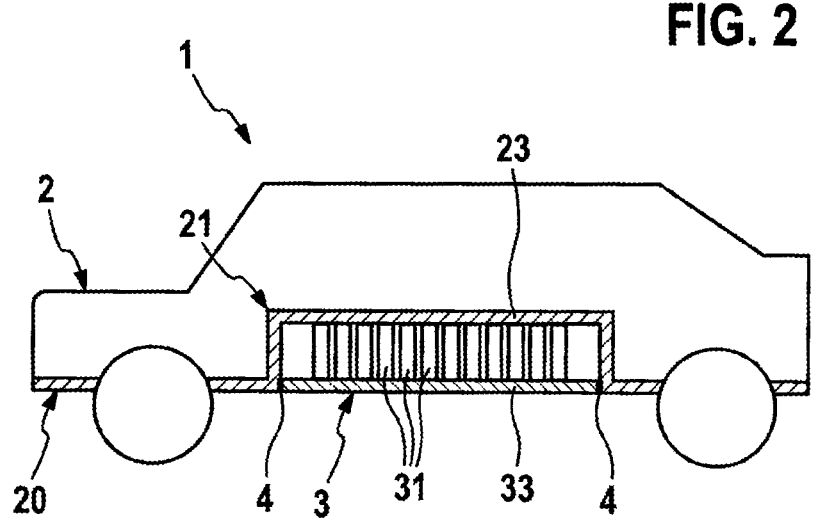
FIG. 2 is a schematic illustration of the vehicle from FIG. 1 with a mounted battery.

As can be seen in FIG. 1, the vehicle 1 according to the invention comprises a vehicle body 2 and a battery 3.

According to the invention, the term "vehicle body" is to be understood as the components of the vehicle which define the outer circumference of the vehicle. In this connection, for example, an underbody 20 also belongs to the vehicle body 2.

As can be seen in FIG. 1, the underbody 20 has a recess 22. The recess 22 is substantially square-shaped and is used to receive a battery 3 (cf. FIG. 2).

As can be seen in FIG. 1, the battery 3 comprises a multiplicity of energy storage devices 31, for example battery cells or battery modules, and a battery housing 32. In this exemplary embodiment, the battery housing 32 is a base plate 33 on which the energy storage devices 31 are arranged. These can be fastened, for example by means of screws, to the base plate 33.

The other parts of the housing 32 of the battery 3 are provided by the vehicle body 2. As can be seen, in particular, in the mounted state of FIG. 2, the recess 22 forms the remaining housing parts of the housing 32 of the battery 3. More precisely, the underbody 20 of the vehicle body comprises a shielding vehicle-body region 21 which is defined by the recess 22. The shielding vehicle-body region 21 comprises a cover 23 of the housing, a first wall 24, a second wall 25 and a third wall 26. A fourth wall is not illustrated in FIG. 1; however, it is also present. The walls 24, 25, 26 are in this case substantially perpendicular to the cover 23 and have dimensions such that the battery 3 can be completely inserted into the recess 22.

In this connection, a surrounding connection 4 is provided between the base plate 33 of the battery 3 and the wall regions 24, 25, 26. The connection 4 is electrically conductive.

The base plate 33 of the battery 3 is likewise made from an electrically conductive material or, alternatively, comprises an electrically conductive material which is arranged flat in the base plate 33 and may be, for example, encapsulated by a plastics material or the like. In an identical manner, the walls and the cover 23 of the recess 22 are either made from an electrically conductive material or, alternatively, comprise an electrically conductive material which is provided flat in the walls or in the cover.

Owing to said flat provision of electrically conductive material, electrical and/or magnetic shielding of the battery 3 with respect to the rest of the vehicle 1 is achieved.

In this connection, it should be noted that the base plate 33 does not compulsorily have to be made from an electrically conductive material or comprise an electrically conductive material since electrical and/or magnetic radiation directed toward a road surface does not have a negative electromagnetic effect on components of the vehicle. However, for complete shielding, the base plate 33 is also preferably equipped with a shielding effect.

Thus, according to the invention, the battery 3 does not need to have a completely surrounding housing but partial regions of the housing of the battery are provided by the vehicle body. In this connection, a shielding vehicle-body region 21 is provided in order to improve the electromagnetic compatibility of the battery.

Thus, according to the invention, even in the event of an insulation fault, for example, of the battery 3, a person can touch the battery at different points without receiving an electric shock because the current flows through the housing of the battery 3 and not through the body. Since, according to the invention, the housing of the battery is connected to the vehicle body of the vehicle and the connection is electrically conductive, it is virtually precluded for two regions on the housing or the vehicle body to be at different electrical potentials. As a result, even in the event of a fault in the battery, people are protected against electric shocks.

Figure 3:
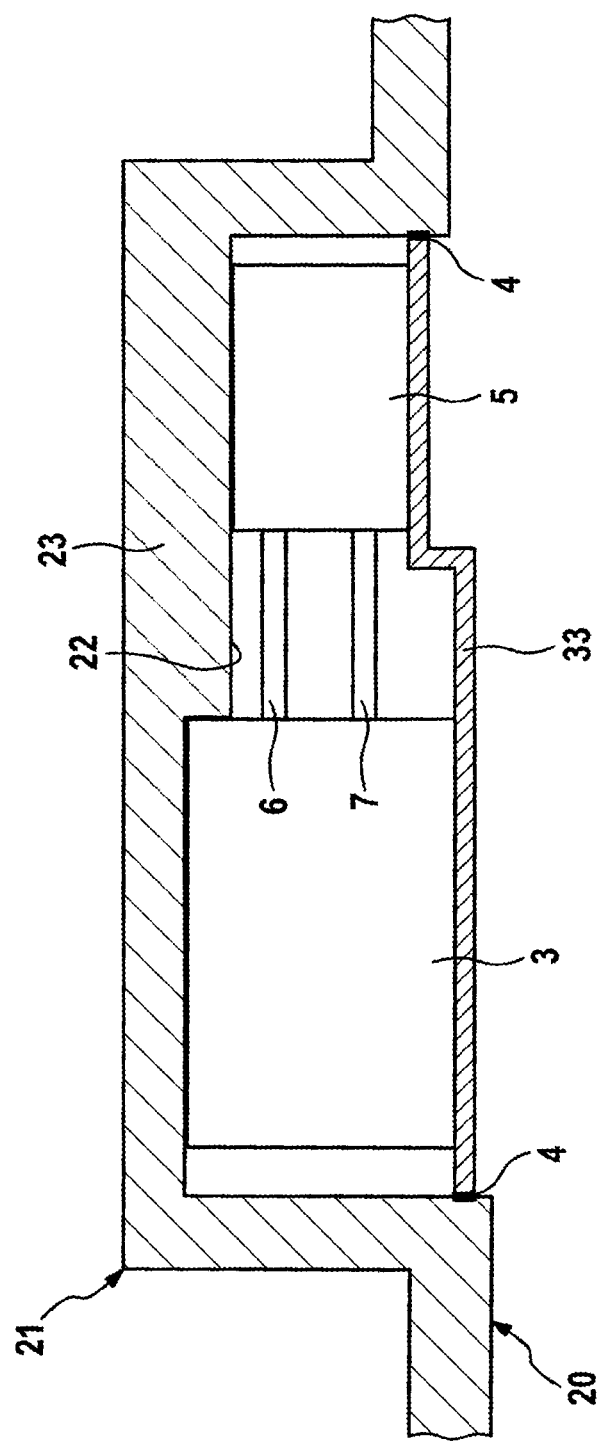
FIG. 3 is a schematic partially cut-away view of a vehicle body according to a second exemplary embodiment of the invention.

FIG. 3 shows a second exemplary embodiment of the invention wherein, in addition to the battery 3, an inverter 5 is additionally arranged in the recess 22 in the vehicle body 2 of the vehicle. As a result of this, in particular, it is possible to dispense with separate shielding of the inverter 5 against electrical and/or magnetic fields and also to dispense with lines 6, 7 which connect the battery 3 to the inverter 5. The inverter 5 is mounted together with the battery 3 on the base plate 33.

What is claimed is:

1. A vehicle, comprising:
   a vehicle body (2); and
   a battery (3) with energy storage devices (31) and a housing (32), which at least partially surrounds the energy storage devices (31),
   wherein a shielding vehicle-body region (21) of the vehicle body (2) forms a part of the housing of the battery (3),
   wherein the shielding vehicle-body region (21) is made from an electrically conductive material or comprises electrically conductive material, and
   wherein an electrically conductive connection is formed between the shielding vehicle-body region and the housing of the battery.

2. The vehicle according to claim 1, characterized in that the shielding vehicle-body region (21) forms a cover of the housing.

3. The vehicle according to claim 1, characterized in that the shielding vehicle-body region (21) forms a base of the housing.

4. The vehicle according to claim 1, characterized in that the shielding vehicle-body region forms walls (24, 25, 26) of the housing.

5. The vehicle according to claim 1, characterized in that the shielding vehicle-body region (21) is a part of an underbody (20) of the vehicle.

6. The vehicle according to claim 1, characterized in that the vehicle body (2) has a recess (22) in which the energy storage devices (31) are at least partially arranged.

7. The vehicle according to claim 1, characterized in that the housing of the battery (3) comprises an electrically conductive material for shielding against electrical and/or magnetic fields of the energy storage device (31).

8. The vehicle according to claim 1, characterized in that the connection (4) between the shielding vehicle-body region (21) and the housing (32) includes metal resilient contacts.

9. The vehicle according to claim 1, also comprising an inverter (5), which is connected to the battery (3), wherein the inverter (5) is at least partially shielded by the shielding vehicle-body region (21).

10. The vehicle according to claim 1, characterized in that the vehicle body (2) has a recess (22) in which the energy storage devices (31) are completely arranged.

11. The vehicle according to claim 1, characterized in that a cohesive connection is provided between the shielding vehicle-body region (21) and the housing (32).

* * * * *